US005838017A

United States Patent [19]

Prassler

[11] Patent Number: 5,838,017

[45] Date of Patent: Nov. 17, 1998

[54] CONTROL DEVICE FOR MONITORING THE PASSAGE OF TWO SUPERIMPOSED PAPER WEBS IN A PAPER PROCESSING MACHINE

[75] Inventor: Max Prassler, Augsburg, Germany

[73] Assignee: Boewe Systec AG, Augsburg, Germany

[21] Appl. No.: 894,720

[22] PCT Filed: Dec. 21, 1995

[86] PCT No.: PCT/DE95/01858

§ 371 Date: Aug. 8, 1997

§ 102(e) Date: Aug. 8, 1997

[87] PCT Pub. No.: WO96/26146

PCT Pub. Date: Aug. 29, 1996

[30] Foreign Application Priority Data

Feb. 24, 1995 [DE] Germany ........................ 195 06 456.9

[51] Int. Cl.[6] ........................ G01N 21/86

[52] U.S. Cl. ........................ 250/559.42; 250/559.43; 356/430

[58] Field of Search ........................ 250/559.42, 559.43, 250/559.12, 559.46, 223 R; 356/430, 237, 238, 239

[56] References Cited

U.S. PATENT DOCUMENTS 5,095,214 3/1992 Eder ........................ 250/559.42

*Primary Examiner*—Que Le

*Attorney, Agent, or Firm*—Flynn, Thiel, Boutell & Tanis, P.C.

[57] ABSTRACT

A control device (3) for monitoring the travel of two superimposed paper webs (1, 2) in a paper processing machine has a thin stationary plate (4) arranged at the edge of the paper webs (1, 2) that extends between both paper webs in the direction of travel of the paper. Reflection-sensitive photoelectric sensors (5, 6) are arranged on opposite sides of the plate (4) so that the light rays (5*a*, 6*a*) from both sensors are projected from opposite directions upon the corresponding paper web (1, 2) and the plate (4) located behind the paper web.

6 Claims, 1 Drawing Sheet

5
4.1
4.2
5a
6a
I
I
6
4
1
2
A 3
4.1
4.2
5a
6a
II
II
5
4
6
1
2

CONTROL DEVICE FOR MONITORING THE PASSAGE OF TWO SUPERIMPOSED PAPER WEBS IN A PAPER PROCESSING MACHINE

This invention relates to a control device for monitoring the passage of two superimposed paper webs in a paper processing machine, with photoelectric sensors, whose light beams are directed on to the surfaces of the paper webs.

In some paper processing machines, e.g. in an automatic account processing installation which follows a laser printer, the passage of two superimposed paper webs has to be monitored. The account processing installation has a so-called slitter/merger unit. In this unit a wide paper web is firstly divided along the middle by longitudinal cutter knives, so that two half-width paper webs result. These two paper webs are then placed one on the other and fed on superimposed with their edges aligned. Since the wide paper web is already provided with transverse perforations which are arranged with the spacing of the format height, it can happen that one of the paper webs tears and is not fed on with the second paper web. A control device is necessary for this reason, which monitors the presence of two superimposed paper webs. A known control device operates with a light barrier which illuminates both paper webs simultaneously. The light barrier must be so adjusted that no light falls on the receiving photocell in the presence of two paper webs, while the light beam penetrates the remaining paper web when one paper web is missing, and falls on the receiving photocell. For this system to function, the light barrier must adjusted by the person running the machine for the transparency of the current paper webs. If this is forgotten, the control device no longer responds when processing a paper quality of lower transparency or no longer responds reliably. The known control device is not suitable at all for thicker papers or those of low transparency.

A paper feed device for a printer is known from U.S. Pat. No. 4,467,949, in which the paper web is driven by a motorised drive roller. In order to monitor the paper web a light-emitting diode is provided behind the drive roller with a photo-transistor optically aligned opposite thereto. When no paper web is present between the diode and photo-transistor, the latter is turned on, whereas when a paper web is present between the two, it interrupts the light emitted by the diode and the photo-transistor is turned off. This device is only suitable for monitoring a single paper web and not for monitoring two superimposed paper webs, since the light beam is already interrupted by a single paper web, even if the second paper web is no longer present.

The invention is therefore based on the object of providing a control device for monitoring the passage of two superimposed paper webs in a paper processing machine, of the kind initially referred to, which makes it possible with a simple structure to monitor reliably paper webs of any transparency, without adjusting operations being necessary when there is a change in paper quality.

This is achieved by the features set out in claim 1 or 5.

The invention is thus based on the concept of monitoring the passage of each individual paper web by its own photoelectric sensor responding to reflection. With passage free from disturbance the light beam emitted by each sensor is reflected by the associated paper web and received by the receiver part thereof. If however the associated paper web tears in a region preceding the plate, the surface of the plate facing the torn paper web is no longer covered by the paper web, as soon as the end of the torn paper web adjoining the tear has passed the plate. Since the surface of the plate has different reflective properties than the paper web, the sensor associated with the torn paper web responds and issues a corresponding signal. The surfaces of the plate can be so chosen that they guarantee different reflection properties from all the kinds of paper which will pass through the paper processing machine. As a result the photoelectric sensors always react only when no or too little light is reflected from the paper surface in the absence of one paper web. The control device according to the invention does not therefore have any longer to be adjusted to the current paper transparency, in contrast to the control device initially referred to, so that errors are avoided. Moreover the passage of the paper is not affected by the thin plate.

Advantageous arrangements of the invention are characterized in the dependent claims.

BRIEF DESCRIPTION OF THE DRAWINGS

The invention will be explained in more detail with reference to an embodiment shown in the drawings, in which.

DETAILED OF THE INVENTION

Figures 1, 2:
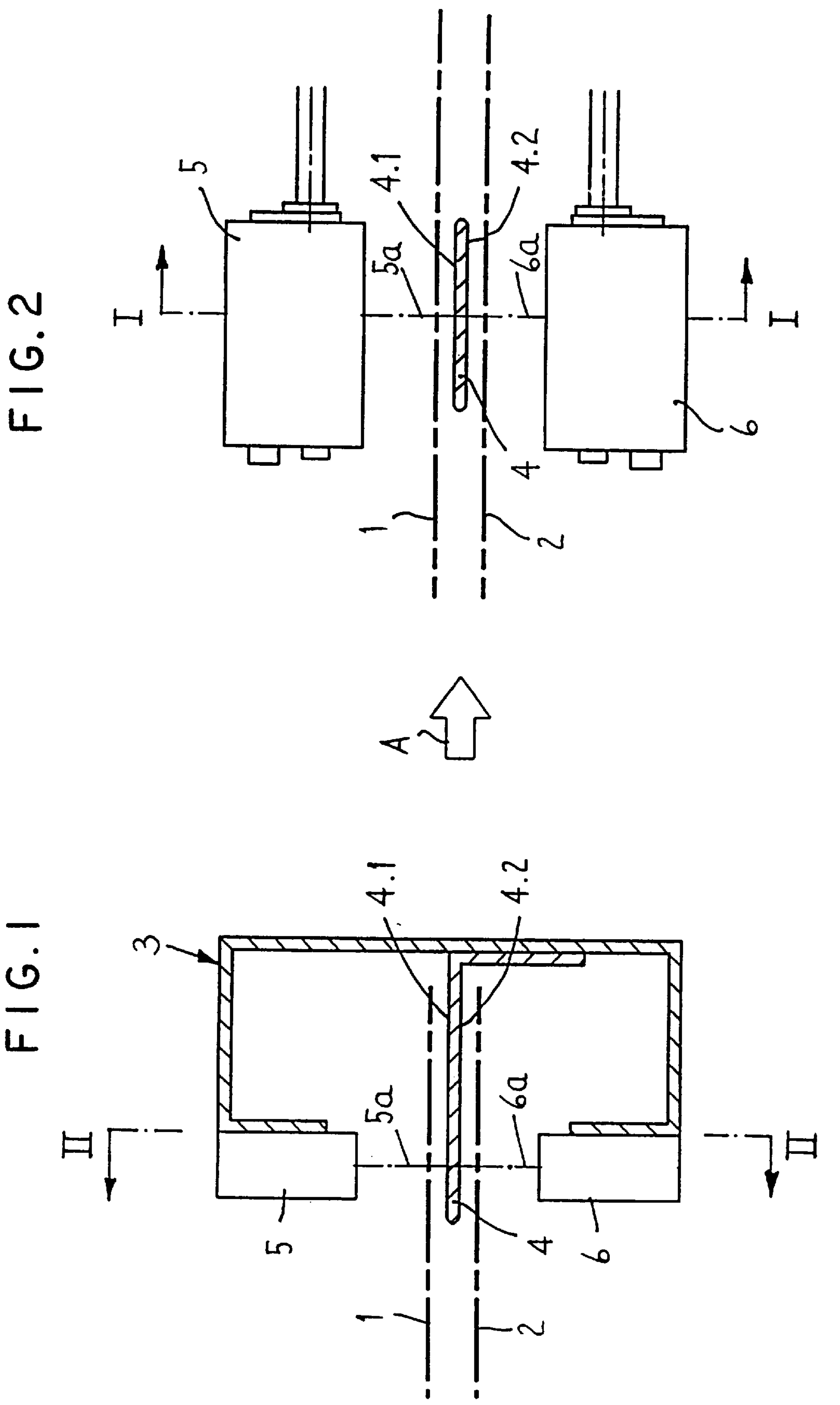
FIG. 1 is a cross-section of the control device transverse to the paper feed direction, on the line I—I of FIG. 2.
FIG. 2 is a longitudinal section of the control device on the line II—II of FIG. 1.

Two superimposed paper webs are denoted 1 and 2 in the drawings and are moved in a paper processing machine lying one on the other, in the paper feed direction A. The control device 3 comprises a thin plate 4 which extends in the paper feed direction A and which engages at the edge of the paper webs 1, 2 between these. Photoelectric sensors 5 and 6 responding to reflection are arranged on the two opposite sides respectively of the plate. The light beams 5*a* and 6*a* of these two sensors 5, 6 are directed from opposite sides perpendicularly on to the associated paper webs 1 and 2 respectively and the plate 4 arranged behind these.

The surfaces 4.1 and 4.2 of the plate 4 facing the sensors 5, 6 must have a totally different reflectivity from the paper webs 1 and 2. Since paper, especially white paper which will mostly be processed here, has good reflectivity, the two surfaces 4.1 and 4.2 are made light absorbing. The surfaces 4.1 and 4.2 can be blackened. The whole plate 4 can advantageously be made from a black plastics material.

Operation is as follows:

So long as both paper webs 1, 2 are present, the light beams 5*a* and 6*a* emitted by the associated photoelectric sensors 5 and 6 respectively are reflected by the paper webs 1 and 2 respectively and the receiving part of each sensors 5, 6 receives this reflected light. The sensors 5, 6 are so adjusted or designed that they to not react when reflected light is incident. If however the upper paper web 1 for example tears before the plate 4, in the feed direction A, the surface 4.1 is no longer covered by the paper web 1, as soon as the end adjoining the tear has passed the plate. The light beam 5*a* is then no longer reflected by the black surface 4.1. This is recognised by the receiving part of the sensor 5 and the machine is stopped by a corresponding signal.

If desired the plate can have light reflecting surfaces on its sides facing the two sensors. In this case it is however advantageous for these surfaces to be inclined obliquely relative to the paper feed direction or obliquely relative to the light beams emitted by the sensors. If a paper web is missing, the light beam emitted by the corresponding sensor is no longer reflected to the associated sensor by the obliquely inclined reflecting surface according to the law that the angle of incidence equals the angle of reflection, and the receiving part of the sensor reacts accordingly.

I claim:

1. A control device for monitoring the passage of two superimposed paper webs in a paper processing machine, with photoelectric sensors, whose light beams are directed on to the surfaces of the paper webs, characterized in that a thin, stationary plate (4) is provided at the edges of the paper webs (1, 2), engaging between the two paper webs and extending in the direction (A) of passage of the paper webs and whose surface has different reflective properties than the paper webs, and in that a respective photoelectric sensor (5, 6) responding to reflection is so arranged on each of the two opposite sides of the plate (4) that the light beams **(5*a*, 6*a*) of the two sensors are directed on to respective opposite sides of the corresponding paper webs (1, 2) and the plate (4)** lying thereunder.

2. A device according to claim 1, characterized in that the plate (4) has light-absorbing surfaces (4.1, 4.2) on its two sides facing the sensors (5, 6).

3. A device according to claim 2, characterized in that the surfaces (4.1, 4.2) are blackened.

4. A device according to claim 2, characterized in that the plate (4) consists of black plastics material.

5. A control device for monitoring the passage of two superimposed paper webs in a paper processing machine, with photoelectric sensors, whose light beams are directed on to the surfaces of the paper webs, characterized in that a thin, stationary plate is provided at the edges of the paper webs, engaging between the two paper webs, whose surfaces are inclined relative to the paper feed direction, and in that a respective photoelectric sensor responsive to reflection is arranged on each of the two opposite sides of the plate, in that the light beams of the two sensors are directed from respective opposite sides on to the associated paper webs and the plate lying behind thereunder.

6. A control device according to claim 5, characterized in that the plate has light-reflecting surfaces on its two sides facing the sensors.

* * * * *

UNITED STATES PATENT AND TRADEMARK OFFICE

CERTIFICATE OF CORRECTION

PATENT NO. : 5 838 017

DATED : November 17, 1998

INVENTOR(S) : Max PRASSLER

It is certified that error appears in the above-identified patent and that said Letters Patent is hereby corrected as shown below:

Column 4, line 16; delete "behind".

Signed and Sealed this

Eighteenth Day of May, 1999

Attest:

Q. TODD DICKINSON

*Attesting Officer*

*Acting Commissioner of Patents and Trademarks*